July 28, 1931. S. C. VERTS 1,816,802

VEHICLE SEAT

Filed Aug. 23, 1929

Sydenham C. Verts,
INVENTOR

BY Victor J. Evans
ATTORNEY

Leo Haijos
WITNESS

Patented July 28, 1931

1,816,802

UNITED STATES PATENT OFFICE

SYDENHAM C. VERTS, OF BEACH HAVEN, NEW JERSEY

VEHICLE SEAT

Application filed August 23, 1929. Serial No. 387,938.

The present invention relates to a seat of novel construction, and while primarily intended for use as a vehicle seat, its general application is contemplated by the claim.

The chief characteristic of the present invention resides in the provision of a one-piece or full floating seat including a back rest, whereby the seat and back rest is yieldably supported for movement in any direction with relation to its support, whereby the seat can be occupied with maximum comfort or relaxation, especially by one sitting for a long period of time while driving a motor vehicle or the like.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views, and wherein:—

Figure 1:
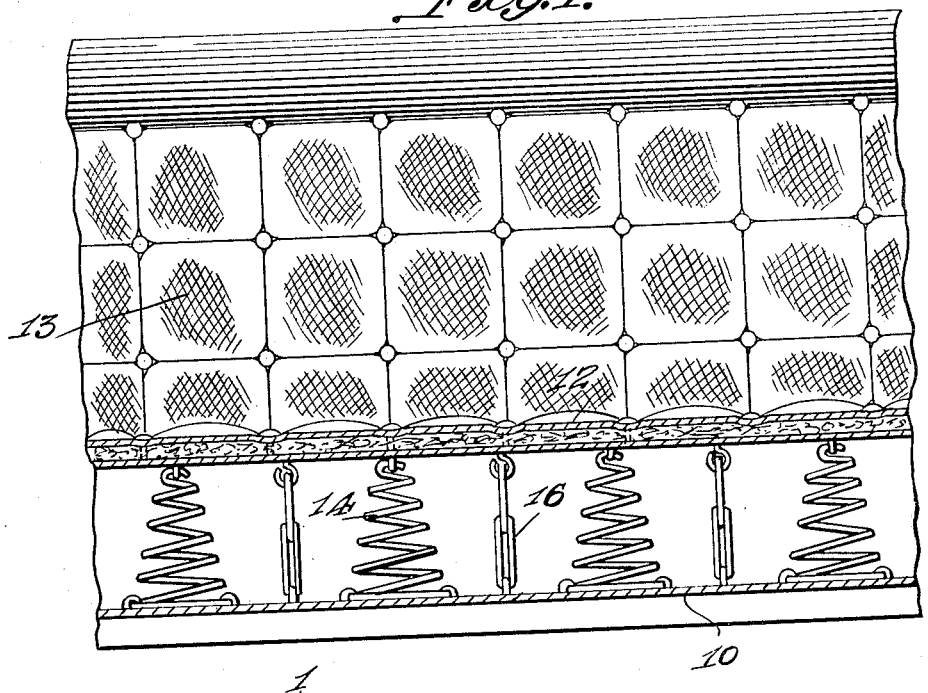
Figure 1 is a sectional view on line 1—1 of Figure 2.

Referring to the drawings in detail, I have illustrated a seat support which may be constructed from any suitable material, preferably wood or metal, and comprising a seat portion 10 and a back portion 11. the one-piece full floating seat includes a seat portion 12 and a back rest 13, and it might here be stated that this seat can be constructed from any suitable material, although I have illustrated an upholstered seat of present day construction. Interposed between the seat and its support is a plurality of vertically disposed coil springs 14, while arranged between the back rest and its support is a plurality of similar springs 15.

Figure 2:
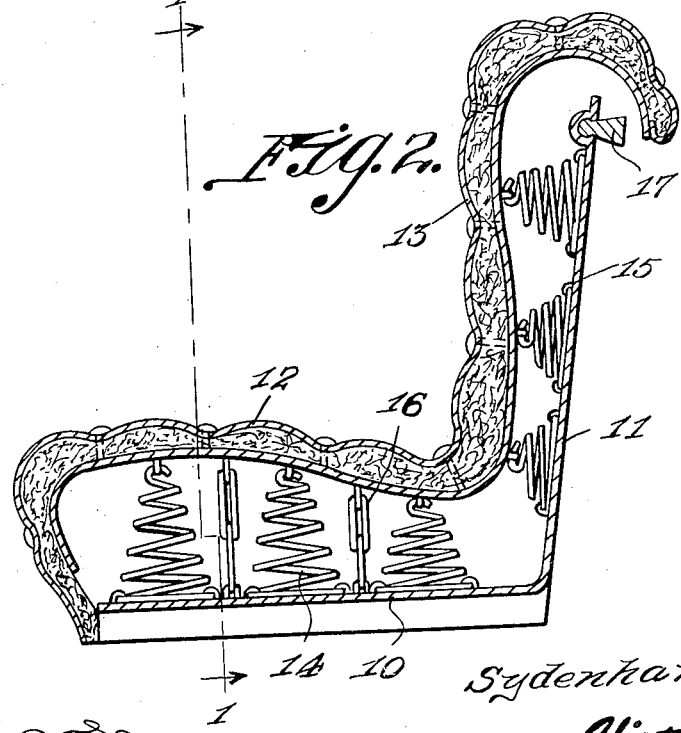
Figure 2 is a vertical sectional view through the seat.

While I have illustrated the springs 14 and 15 for yieldably supporting the seat and back rest for vertical, horizontal and lateral movements with relation to its support, it is of course to be understood that the floating seat may be supported for movements of this character by pneumatic cushions or any other suitable means, and that the springs may be either coiled or flat, elliptical or any other construction suitable for the purpose intended. It will be noted upon inspection of Figure 2 that the forward portion or edge of the seat 12 extends downwardly beyond the forward edge of its support, while the upper end of the back rest 13 is preferably curved outwardly and downwardly beyond the upper edge of its support, although these edges are spaced from the support to permit of the full floating movements of the seat proper. Furthermore, suitable links 16 connect the seat 12 with its support to limit the vertical movement thereof as will be readily understood. If desired, the links 16 can be formed of springs of various shapes so constructed that they will only come into play on the rebound or recoil of the seat, and thereby act as shock absorbers at the limit of the movement of the seat. Such links may also be used to limit the movement of the seat in any direction. The movements or motions of the seat are to be controlled or governed by suitable stops carried by the seat support, one of which is indicated at 17 and is preferably constructed of rubber. It is manifest from the construction illustrated and described, that the seat proper including the back rest 13 is mounted for full floating movements, and can be occupied with great comfort or relaxation, and is particularly advantageous or meritorious for drivers of motor vehicles who remain seated for a considerable length of time, as it relieves the driver of the strain and tenseness on the back and neck muscles.

While it is believed that from the foregoing description the nature and advantages of the invention will be readily apparent, I desire to have it known that I do not limit myself to what is herein illustrated and described, and that such changes may be resorted to when desired as fall within the scope of what is claimed.

What I claim is:—

In combination, a seat support, a one-piece seat and back rest, means interposed between the seat and back rest and said support for yieldably supporting the seat and back rest for full floating movements, links connecting the seat with its support to limit the vertical movements of the seat, the upper end of the back rest being curved rearwardly and downwardly beneath and in spaced relation to its support, stops projecting from the support and disposed in the path of movement of the downwardly curved portion of the back rest to limit the forward movement thereof.

In testimony whereof I affix my signature.

SYDENHAM C. VERTS.